United States Patent
Hsiao et al.

(10) Patent No.: US 11,524,904 B2
(45) Date of Patent: Dec. 13, 2022

(54) METHOD OF RAPID TREATMENT OF HEAVY METAL SLUDGE AND PREPARATION OF FERRITE MAGNETS

(71) Applicant: KUN SHAN UNIVERSITY, Tainan (TW)

(72) Inventors: Ming-Chien Hsiao, Tainan (TW); Po-Han Hsiao, Tainan (TW); Hwey-Lin Sheu, Tainan (TW); Vu Nguyen (Hcmute) Lan, Tainan (TW); Anna Anderson, Tainan (TW)

( * ) Notice: Subject to any disclaimer, the term of this patent is extended or adjusted under 35 U.S.C. 154(b) by 89 days.

(21) Appl. No.: 17/313,025

(22) Filed: May 6, 2021

(65) Prior Publication Data

US 2021/0354996 A1     Nov. 18, 2021

(30) Foreign Application Priority Data

May 13, 2020  (TW) .................................. 109115932

(51) Int. Cl.
| | |
|---|---|
| *C01G 49/00* | (2006.01) |
| *H01F 1/10* | (2006.01) |
| *C02F 11/00* | (2006.01) |
| *C02F 103/16* | (2006.01) |
| *C02F 101/20* | (2006.01) |

(52) U.S. Cl.
CPC ........ *C01G 49/0063* (2013.01); *C02F 11/004* (2013.01); *H01F 1/10* (2013.01); *C01P 2002/72* (2013.01); *C01P 2006/42* (2013.01); *C02F 2101/203* (2013.01); *C02F 2103/16* (2013.01)

(58) Field of Classification Search
CPC ....... C01G 49/0063; C02F 11/004; H01F 1/10
See application file for complete search history.

(56) References Cited

FOREIGN PATENT DOCUMENTS

| | | |
|---|---|---|
| CN | 103950987 A | 7/2014 |
| TW | 200619152 A | 6/2006 |

*Primary Examiner* — James A Fiorito

(57) ABSTRACT

A method of rapid treatment of heavy metal sludge and preparation of ferrite magnets comprises following steps of: providing a sludge, the sludge at least having zinc metal and ferrous metal; adding an iron-containing substance to the sludge; pickling the sludge and the iron-containing substance with sulfuric acid to obtain a pickling solution with zinc ions and iron ions; neutralizing the pickling solution with sodium hydroxide to form hydroxide precipitates; and airing and heating the neutralized pickling solution by an ultrasonic-microwave method so that the hydroxide precipitates undergoing a ferrite magnet reaction, thereby obtaining ferrite magnets with a spathic structure.

6 Claims, 2 Drawing Sheets

METHOD OF RAPID TREATMENT OF HEAVY METAL SLUDGE AND PREPARATION OF FERRITE MAGNETS

CROSS-REFERENCE TO RELATED APPLICATION

This application claims priority from Taiwan Patent Application No. 109115932, filed with the Taiwan Patent Office on May 13, 2020, the content of which are hereby incorporated by reference in their entirety for all purposes.

BACKGROUND OF THE INVENTION

1. Field of the Invention

The invention relates to a sludge treatment method, and more particularly to a method of rapid treatment of heavy metal sludge and preparation of ferrite magnets.

2. Description of the Related Art

Wire sludge is an exhaustive limited metal resource of artificial minerals and cannot be regenerated. At present, smelting is mainly used to process wire sludge containing heavy metals to improve the recovery of valuable metals. Although the method of treating heavy metal sludge with ferrite magnets can achieve an object of recycling waste resources, the time of ferrite magnet reaction in traditional technology requires more than 90 minutes and consumes a considerable amount of energy.

SUMMARY OF THE INVENTION

In view of the above, an object of the invention is to provide a method of rapid treatment of heavy metal sludge and preparation of ferrite magnets to solve the above-mentioned problems of the prior art.

In order to achieve the foregoing object, the invention discloses a method of rapid treatment of heavy metal sludge and preparation of ferrite magnets comprising following steps of: providing a sludge, the sludge at least having zinc metal and ferrous metal; adding an iron-containing substance to the sludge; pickling the sludge and the iron-containing substance with sulfuric acid to obtain a pickling solution with zinc ions and iron ions; neutralizing the pickling solution with sodium hydroxide to form hydroxide precipitates; and airing and heating the neutralized pickling solution by an ultrasonic-microwave method for 20 minutes so that the hydroxide precipitates undergoing a ferrite magnet reaction, thereby obtaining ferrite magnets with a spathic structure, wherein a microwave power of the ultrasonic-microwave method is 300 watts, and an ultrasonic power of the ultrasonic-microwave method is 300 watts.

Preferably, a molar ratio of zinc ions to iron ions in the pickling solution is between 1:2 and 1:10.

Preferably, a molar ratio of zinc ions to iron ions in the pickling solution is 1:4.

Preferably, a temperature of the ferrite magnet reaction is controlled between 50 degrees Celsius and 90 degrees Celsius.

Preferably, a temperature of the ferrite magnet reaction is controlled at 70 degrees Celsius.

Preferably, an air flow rate of the step of airing is between 0.1 and 4 liters/minute (LPM).

Preferably, an air flow rate of the step of airing is 2 liters/minute.

Preferably, a pH value of the pickling solution after neutralization with sodium hydroxide is between 9 and 13.

Preferably, the iron-containing substance is iron filings.

Preferably, the ultrasonic-microwave method further comprises stirring the hydroxide precipitates in the pickling solution at a stirring speed between 150 rpm and 200 rpm.

Based on the above, the method of rapid treatment of heavy metal sludge and preparation of the ferrite magnets according to the invention can have one or more of the following advantages:

(1) The invention uses ultrasonic-microwave as a heating method to carry out the ferrite magnet reaction is capable of greatly reducing the heating time of the traditional water bath.

(2) In the invention, the ferrite magnet reaction can be completed in 22% of the time of traditional technology by heating with ultrasonic-microwave.

(3) A filtrate processed by the ferrite magnetization technology of the invention meets the water discharge standard and the leaching standard of toxicity characteristic leaching procedure (TCLP), which can achieve an object of harmless treatment.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE PREFERRED EMBODIMENTS

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers.

Wire sludge is an exhaustive limited metal resource of artificial minerals and cannot be regenerated. At present, smelting is mainly used to process wire sludge containing heavy metals to improve the recovery of valuable metals. Although the method of treating heavy metal sludge with ferrite magnets can achieve an object of recycling waste resources, the time of ferrite magnet reaction in traditional technology requires more than 90 minutes and consumes a considerable amount of energy.

The invention uses ultrasonic-microwave as a heating method to carry out a ferrite magnet reaction, which can greatly reduce the heating time of the traditional water bath. Moreover, through oxidation-reduction potential (ORP) monitoring results, it can be known that the invention is capable of completing the ferrite magnet reaction within 20 minutes by ultrasonic-microwave heating, which means that the invention only requires 22% of the time of traditional technology. In addition, based on the results of water quality analysis, a filtrate processed by the ferrite magnetization technology of the invention meets the water discharge standard. According to the XRD identification results, a ferrite magnet crystalline product is confirmed, and a solid product after treatment meets the leaching standard of toxicity characteristic leaching procedure (TCLP), which can achieve an object of harmless treatment.

Figure 1:
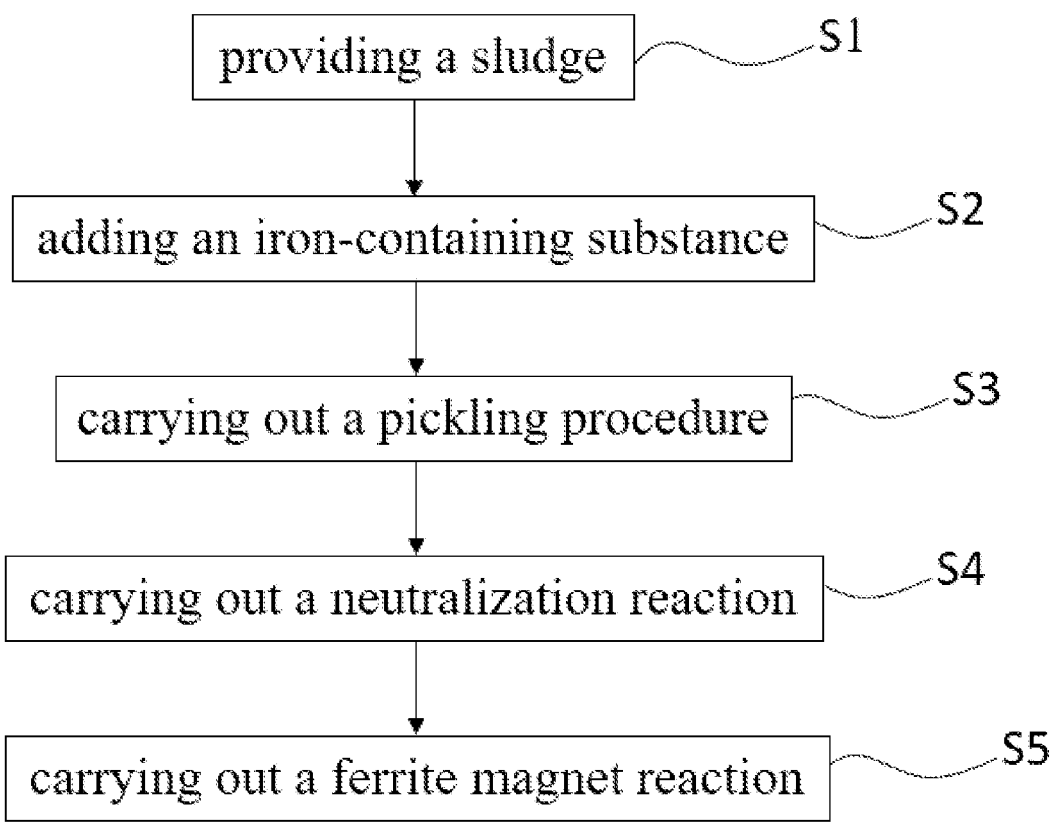
FIG. 1 is a flow chart of a method of rapid treatment of heavy metal sludge and preparation of ferrite magnets of the invention.

In the invention, zinc sulfate is extracted and ferrous sulfate is produced by reaction from zinc (Zn) and iron (Fe)-containing wire sludge and iron (Fe)-containing iron filings processed by an ultrasonic-microwave method combined with sulfuric acid method, and sodium hydroxide (NaOH) is added and used as a reactant of the ferrite magnet reaction to form a ferrite magnet system, which is then quickly synthesized by microwaves. Please refer to FIG. 1. FIG. 1 is a flow chart of a method of rapid treatment of heavy metal sludge and preparation of ferrite magnets of the invention. The method of rapid treatment of heavy metal sludge and preparation of the ferrite magnets of the invention comprises following steps of: step 1 (S1), providing a sludge, the sludge at least having zinc metal and ferrous metal; step 2 (S2), adding an iron-containing substance to the sludge; step 3 (S3), pickling the sludge and the iron-containing substance with sulfuric acid to obtain a pickling solution with zinc ions and iron ions, wherein a molar ratio of zinc ions to iron ions in the pickling solution is 1:2 to 1:10; step 4 (S4), carrying out a neutralization reaction, neutralizing the pickling solution with sodium hydroxide to form hydroxide precipitates; and step 5 (S5), airing and heating the neutralized pickling solution by an ultrasonic-microwave method for 20 minutes to carry out a ferrite magnet reaction, thereby obtaining ferrite magnets with a spathic structure, wherein an object of airing is for aeration, and a temperature during airing is preferably higher than 70 degrees Celsius, and more preferably maintained above 70 degrees Celsius.

In detail, in step 1, the invention first provides the sludge, such as wire sludge, wherein the wire sludge contains at least zinc metal and ferrous metal. The invention uses zinc-containing wire sludge as a reactant. A total concentration of wire sludge and TCLP are tested using standard detection methods (microwave digestion atomic spectrometry and toxicity leaching test). Properties of the wire sludge are shown in Table 1. The wire sludge contains high amounts of zinc (Zn) ions and iron (Fe) ions with original concentrations of 4,793.8 and 15,862 mg/kg, respectively, and TCLP concentrations are 10.43 and 60.85, respectively.

TABLE 1

Properties of the wire sludge

| Metal ion | Iron ion | Zinc ion |
|---|---|---|
| Original concentration (mg/kg) | 15,862 | 4,793.8 |
| TCLP concentration (mg/kg) | 60.85 | 10.43 |

In step 2, the invention adds an appropriate amount of the iron-containing substance such as iron filings to the sludge. In step 3, the invention uses sulfuric acid to pickle the sludge and iron-containing substance to obtain the pickling solution with zinc ions and iron ions, wherein a molar ratio of zinc ions to iron ions ($Fe^{2+}$) in the pickling solution is controlled between 1:2 and 1:10. Wherein a concentration of sulfuric acid is 2N $H_2SO_4$, and a dosage is a solid to liquid ratio of 1:6. In the invention, by calculating an amount of divalent iron ions ([M]/[$Fe^{2+}$]=1:2~1:10, M represents a total concentration of zinc ions) required by the ferrite magnets in a solution containing zinc sulfate, an amount of the iron-containing substance such as iron filings to be added can be known. Wherein, in the invention, a molar ratio of zinc ions to iron ions is preferably 1:4.

In step 4, the invention uses sodium hydroxide as a base to neutralize the pickling solution, thereby forming the hydroxide precipitates. Wherein a pH value of the pickling solution after neutralization with sodium hydroxide is between 9 and 13, and a pH value of the pickling solution after neutralization with sodium hydroxide is preferably 13.

In step 5, the invention introduces air with a flow rate between 0.1~4 liters/min (LPM) to carry out oxidation reaction, and uses the ultrasonic-microwave method to heat the neutralized pickling solution for 20 minutes to 25 minutes to carry out the ferrite magnet reaction, so that the sodium hydroxide precipitation is transformed from non-crystalline form to the ferrite magnets with a spathic structure, and heavy metal ions (zinc ions) contained in the sludge are embedded in the crystalline structure of the ferrite magnets to form as stable substances. Wherein a flow rate of air is preferably 2 liters/min, a microwave power of the ultrasonic-microwave method is 300 watts, and an ultrasonic power of the ultrasonic-microwave method is 300 watts. A temperature of the ferrite magnet reaction is controlled between 50 degrees Celsius and 90 degrees Celsius, and preferably controlled at 70 degrees Celsius. Wherein the ultrasonic-microwave method further comprises stirring the hydroxide precipitates in the pickling solution at a stirring speed between 150 rpm and 200 rpm. An ultrasonic-microwave machine used in the invention is the model XO-SM50 ultrasonic and microwave combined reaction system produced by Nanjing Xianou Instruments Manufacture Co., Ltd. for carrying out the ultrasonic-microwave method.

TABLE 2

Influence of ultrasonic-microwave reaction time on ferrite magnetization reaction (Time dependence for TCLP of $ZnFe_2O_4$), wherein a microwave power of the ultrasonic-microwave method is 300 watts, an ultrasonic power of the ultrasonic-microwave method is 300 watts, air flow rate is 2 liters/min, temperature is 70 degrees Celsius, and reaction time is 20 minutes.

| Time (minute) | 5 | 10 | 15 | 20 | 25 |
|---|---|---|---|---|---|
| Fe (ppm) | 2.2 | 1.8 | 0.4 | 0.3 | 0.2 |
| Zn (ppm) | 2.3 | 1.1 | 1.0 | 0.2 | 0.1 |

Table 2 shows an influence of ultrasonic-microwave reaction time on ferrite magnetization reaction. In the reaction, when temperature reaches 70° C. or higher, molar ratio of Zn/Fe of 1:4, pH of 13, aeration rate of 2 LPM (Liter Per Minute), temperature of 70 degrees Celsius, and reaction time of 20 minutes are used for treatment. Results can be seen from Table 2, after 20 minutes of reaction and TCLP analysis, zinc concentration can be reduced to 0.2 ppm. Ultrasonic-microwave reaction time will affect formation of the ferrite magnets. According to the results of TCLP analysis, it can be known that the longer the reaction time, leaching of iron and zinc will decrease in larger amounts.

Analysis of ORP results of zinc ferrite magnets prepared from actual zinc sludge under different microwave time conditions are shown in Table 3. In the invention, zinc sulfate and ferrous sulfate are extracted from wire sludge and iron filings by microwave combined with sulfuric acid method, and ferrite magnet solution reaction is carried out. Tests are carried out according to the aforementioned testing conditions, and changes in ORP reaction of aqueous solution are monitored and observed, when reaction is carried out for 5 minutes, ORP increases significantly, which may be caused by OH⁻ in aqueous solution being neutralized due to the decomposition of $Fe(OH)^{2+}$ and the release of $H^+$, and when reaction is carried out for about 20 minutes to 25 minutes, changes of ORP curve tend to be stable. Regarding changes of oxidation-reduction potential, due to changes of reaction rate, when Fe(III) undergoes hydrolysis, [OH⁻] produced by adjusted pH will be comprehensively consumed by $H^+$ produced by hydrolysis reaction to reach a stable state. This result means that the ferrite magnet reaction has been completed. In addition, from observed results of ORP reaction, when reaction temperature is reached and aeration is started, ORP curve will rise sharply after 5 minutes of microwave, and changes in ORP afterwards will maintain a small increase until reaching a maximum value in about 20 minutes, and a small extent of decrease is maintained in subsequent reaction time.

TABLE 3

Analysis of ORP results of zinc ferrite magnets prepared from sludge under different microwave time conditions. Wherein a microwave power of the ultrasonic-microwave method is 300 watts, and an ultrasonic power of the ultrasonic-microwave method is 300 watts (air flow rate is 2 liters/min, temperature is 70 degrees Celsius, reaction time is 20 minutes).

| Time (minute) | 0 | 5 | 10 | 15 | 20 | 25 |
|---|---|---|---|---|---|---|
| ORP | −158 | −102 | −63 | −25 | 3 | 4 |

Zn/Fe molar ratio plays a very important role in influencing the ferrite magnets. According to reaction equations, preparation of the ferrite magnets requires $Fe^{2+}$ the most. Therefore, conversion of 1 mol of zinc ions requires 2 mol of iron ions to produce 1 mole of $ZnFe_2O_4$. According to reaction equations of the ferrite magnets, it can be known that increasing an molar amount of iron ions is beneficial to the generation of the ferrite magnets and an output of the ferrite magnets can be increased. In addition, although excessive amount of iron ions is capable of coating zinc ions in the ferrite magnet reaction, high temperature may cause the continuous production of divalent iron ions during oxidation process, resulting in the formation of $\gamma$-$Fe_2O_3$ or $\alpha$-FeOOH.

Table 4 shows an influence of Zn/Fe molar ratio on the ferrite magnets. A molar ratio of Zn/Fe in the invention is set at 1:2 to 1:10, temperature is controlled above 70 degrees Celsius, and reaction time is 20 minutes. As shown in Table 4, when Zn/Fe molar ratio increases, the ferrite magnets formed have better properties. After TCLP analysis, when molar ratio is 1:4, a leaching amount of zinc decreases from 0.64 ppm to 0.18 ppm, and when molar ratio is 1:8 and 1:10, leaching of zinc decreases in larger amounts after TCLP analysis. It can be known that the greater the molar ratio, the higher the leaching stability of heavy metals after zinc ions are treated with the ferrite magnets. Although a concentration of 1:10 molar ratio is much lower than the standard of discharged water, more sources of iron need to be added. Therefore, Zn/Fe molar ratio of 1:4 is selected as the most suitable ratio.

TABLE 4

Influence of Zn/Fe molar ratio on the ferrite magnets. Wherein a microwave power of the ultrasonic-microwave method is 300 watts, an ultrasonic power of the ultrasonic-microwave method is 300 watts, air flow rate is 2 liters/min, temperature is 70 degrees Celsius, and reaction time is 20 minutes.

| Molar ratio | 1:2 | 1:4 | 1:6 | 1:8 | 1:10 |
|---|---|---|---|---|---|
| Fe (ppm) | 0.62 | 0.31 | 0.27 | 0.21 | 0.11 |
| Zn (ppm) | 0.64 | 0.18 | 0.18 | 0.17 | 0.06 |

Figure 2:
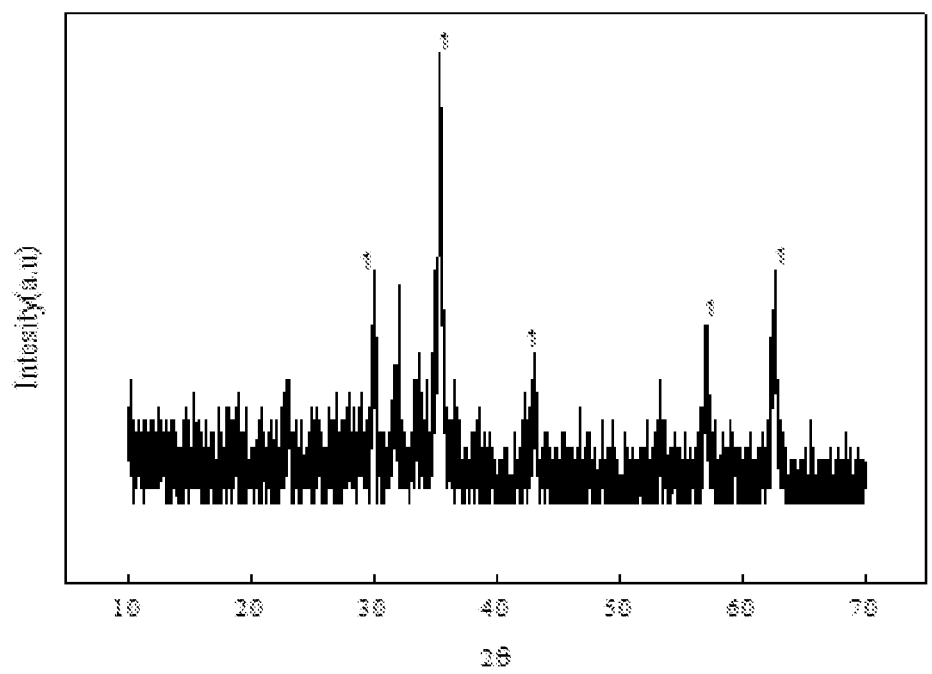
FIG. 2 is an XRD spectrum of zinc ferrite magnets.

In order to understand the analysis of XRD results of zinc ferrite magnets prepared from actual zinc sludge under microwave power conditions, XRD crystalline phase analysis of precipitated products of the ferrite magnet reaction is shown in FIG. 2. FIG. 2 is an XRD spectrum of zinc ferrite magnets. Changes of peaks of the precipitated products of the ferrite magnet reaction are found in FIG. 2, after comparing with the standard spectrum, it is found that the strongest peaks of the zinc ferrite magnets appear at 2θ=35.78 and 63.14. Test conditions in FIG. 2 are microwave power of 300 watts, ultrasonic power of 300 watts, air flow rate of 2 liters/minute, temperature of 70 degrees Celsius, and reaction time of 20 minutes. It can be seen from the spectrum that since other elements in the zinc sludge are relatively low in amounts, a peak intensity of the zinc ferrite magnets is relatively stronger, and a main peak intensity is between 60 and 120. And the ultrasonic-microwave rapid reaction method is capable of facilitating the growth of crystalline phase of the zinc ferrite magnets.

In summary, the above test results show that molar ratio of Zn/Fe is 1:4, reaction temperature is 70 degrees Celsius, and the ORP monitoring results show that the reaction time of the ultrasonic-microwave system can be completed within 20 minutes, which is only 22% of the time of traditional technology. According to the results of water quality analysis, the filtrate processed by the ferrite magnetization technology of the invention meets the water discharge standard. According to the XRD identification results, the ferrite magnet crystalline product is confirmed, and a solid product after treatment meets the leaching standard of toxicity characteristic leaching procedure (TCLP), which can achieve an object of harmless treatment and can be further reused.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:
1. A method of rapid treatment of heavy metal sludge and preparation of ferrite magnets, comprising following steps of:
   providing a sludge, the sludge at least having zinc metal and ferrous metal;
   adding an iron-containing substance to the sludge, wherein the iron-containing substance is iron filings;
   pickling the sludge and the iron-containing substance with sulfuric acid to obtain a pickling solution with zinc ions and iron ions, wherein a molar ratio of zinc ions to iron ions in the pickling solution is between 1:2 and 1:10;

neutralizing the pickling solution with sodium hydroxide until a pH value being between 9 and 13 to form hydroxide precipitates; and airing and heating the neutralized pickling solution by an ultrasonic-microwave method so that the hydroxide precipitates undergoing a ferrite magnet reaction, wherein a temperature of the ferrite magnet reaction is controlled between 50 degrees Celsius and 90 degrees Celsius to obtain ferrite magnets with a spathic structure, wherein a microwave power of the ultrasonic-microwave method is 300 watts, an ultrasonic power of the ultrasonic-microwave method is 300 watts, and a time of the ferrite magnet reaction is between 20 minutes and 25 minutes.

2. The method of rapid treatment of heavy metal sludge and preparation of the ferrite magnets as claimed in claim 1, wherein a molar ratio of zinc ions to iron ions in the pickling solution is 1:4.

3. The method of rapid treatment of heavy metal sludge and preparation of the ferrite magnets as claimed in claim 1, wherein the temperature of the ferrite magnet reaction is controlled at 70 degrees Celsius.

4. The method of rapid treatment of heavy metal sludge and preparation of the ferrite magnets as claimed in claim 1, wherein an air flow rate of the step of airing is between 0.1 and 4 liters/minute (LPM).

5. The method of rapid treatment of heavy metal sludge and preparation of the ferrite magnets as claimed in claim 1, wherein an air flow rate of the step of airing is 2 liters/minute.

6. The method of rapid treatment of heavy metal sludge and preparation of the ferrite magnets as claimed in claim 1, wherein the ultrasonic-microwave method further comprises stirring the hydroxide precipitates in the pickling solution at a stirring speed between 150 rpm and 200 rpm.

* * * * *